G. F. NELSON & J. H. BEAN.
TROCHA CUTTER.
APPLICATION FILED APR. 28, 1905.
979,686.
Patented Dec. 27, 1910.
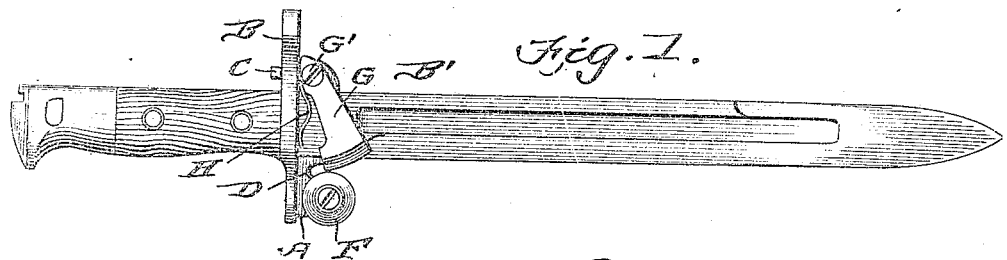
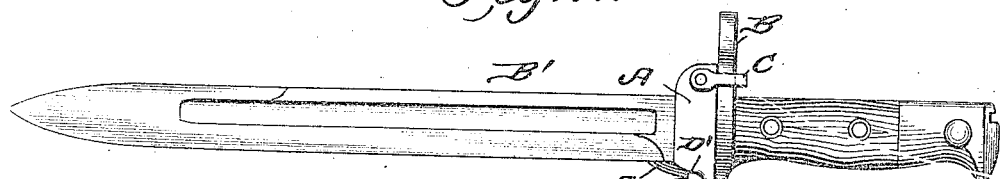
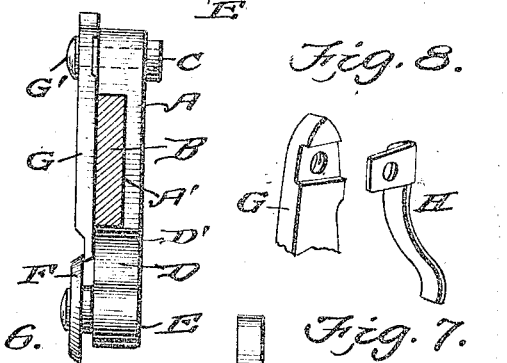
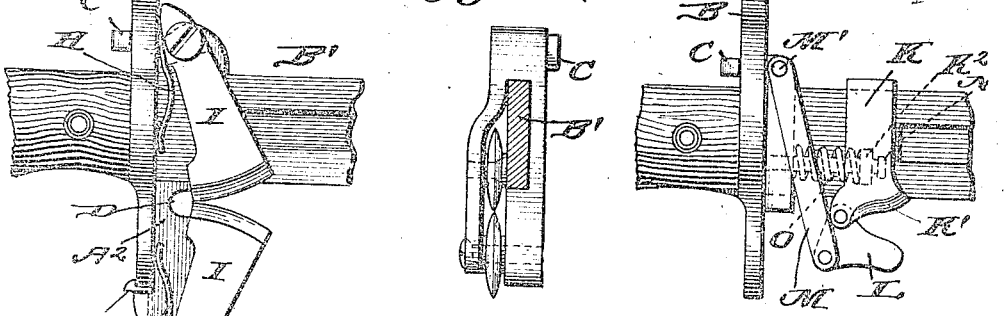
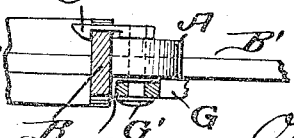
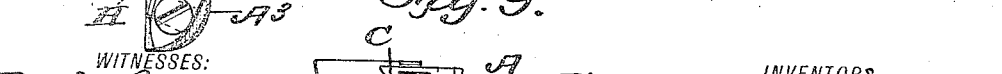
WITNESSES:
INVENTORS
G. F. Nelson,
J. H. Bean,
BY Omer & Brock
ATTORNEYS

UNITED STATES PATENT OFFICE.

GEORGE F. NELSON AND JOSEPH H. BEAN, OF WASHINGTON, DISTRICT OF COLUMBIA.

TROCHA-CUTTER.

979,686.     Specification of Letters Patent.     Patented Dec. 27, 1910.

Application filed April 28, 1905. Serial No. 257,910.

*To all whom it may concern:*

Be it known that we, GEORGE F. NELSON and JOSEPH H. BEAN, both citizens of the United States, residing at Washington, in the District of Columbia, have invented a new and useful Improvement in a Trocha-Cutter, of which the following is a specification.

This invention is a wire cutter adapted to be arranged upon a bayonet for the purpose of quickly and easily cutting barb wire obstructions or trochas, arranged in advance of breastworks or fortifications.

At the present time an attacking party is obliged to send a limited number of troops in advance with a hand operated wire cutter, for the purpose of cutting away the trocha or barb wire obstruction, and this method in addition to being extra-hazardous, is slow and necessarily limited in reference to its scope.

The object of our invention, therefore, is to equip the bayonet with a wire cutter of such construction that it will not interfere with any of the proper functions of the bayonet or rifle and which can be used for the purpose of quickly cutting the wire by simply making a thrust, the bayonet serving to guide the wire into contact with the wire cutter and the impetus of the thrust will bring the wire cutter into effective operation thereby quickly cutting the wire.

Another object of the invention is to provide a wire cutter of such construction that, as soon as one cutting operation has been accomplished, all of the parts will be immediately returned to their normal positions ready for another operation.

Another object of the invention is to provide a wire cutter which can be quickly and easily attached to and detached from the bayonet, which can be permanently connected to the bayonet at the time of its manufacture.

With these objects in view, and certain others, as will hereinafter appear, the invention consists essentially in providing the bayonet with a wire cutter.

The invention also consists in providing the wire cutter which can be quickly and easily attached to and detached from the bayonet, and the invention consists also in providing a bracket adapted to be arranged upon the hilt of the bayonet, said bracket carrying two wire cutting members, one of which is pivoted and spring actuated, and the invention consists also in the novelties of construction, and combination, hereinafter fully described and pointed out in the claims.

In the drawings forming a part of this specification Figure 1 is a face view of a bayonet provided with our construction of trocha or wire cutter. Fig. 2 is a similar view showing the reverse side of the bayonet. Fig. 3 is a perspective view of the cutter detached from the bayonet. Fig. 4 is a view showing a slight modification in which the cutting edges work past each other, thereby shearing the wire. Fig. 5 is a view showing a slightly modified form, comprising two pivoted cutting blades. Fig. 6 shows another modification having two rotary cutters. Fig. 7 shows still another modification. Figs. 8 and 9 show details of construction.

It is obvious that our invention may be applied to the bayonet, at the time of manufacture or it may be applied thereto subsequently and in practice, we prefer to employ a dropped, forged bracket A, recessed at A', to receive and fit snugly upon the bayonet, the bottom of the said bracket resting upon the hilt B, of the bayonet B', and a spring catch C carried by the bracket is adapted to engage the lower edge of the hilt and securely hold the bracket upon the bayonet. The bracket A is formed with a wire receiving notch or opening D, adjacent one end thereof, thereby providing the bracket lug E, upon which is mounted a rotary cutter disk or wheel F. The edge of the notch or opening D adjacent the bayonet, is curved as shown at D', so that when the said bayonet is thrust across the wire to be cut, said wire is guided down into the opening D, toward the cutter disk or wheel E, and pivoted to the bracket, adjacent the opposite end, is a cutting blade G, the cutting edge of which is curved upon the arch of a circle and is adapted to co-act with the cutting edge of the disk or wheel, for the purpose of severing the wire, the wire being forced between the said cutting edges as the bayonet is thrust forward and the forward movement of the bayonet, forcing the wire into contact with the cutting edges also serves to swing the cutting blade upon its pivot, thereby completing the cutting operation, and it will be noted that the forward end of the curved cutting edge of the blade, rests slightly above the lower edge of the bayonet so that the said cutting edge also serves to guide the wire toward the cutting disk, so that the cutting operation begins from the moment the wire is caught between the cutting blade and disk and the continued forward movement of the bayonet, causes the cutting operation to be completed.

A spring H carried by the swinging cutter blade G, bears upon the hilt of the bayonet and serves to throw the cutting blade, to its normal or open position, the moment that the cutting operation has been completed, and in practice, we prefer to connect this spring to the swinging blade, by recessing the pivotal end of said blade and locating the upturned end of the spring therein, the pivotal bolt G', serving to hold said spring in place and also pivotally connecting the cutting blade to the bracket.

From the foregoing description, taken in connection with the accompanying drawing, it will be seen that we provide, a simple, durable and efficient form of wire cutter, which can be quickly and easily attached to the ordinary bayonet, now in common use, and by means of which, wire obstructions can be quickly and easily severed by simply giving the bayonet a quick thrust along the wire to be cut, thereby bringing the wire into contact with the cutting devices.

In Fig. 4, we have shown a slight modification in which the cutting edge of the blade works behind the cutting edge of the disk or wheel hereby shearing the wire.

In Fig. 5, we have shown a cutter comprising two cutting blades, I, adapted to coact with each other, this construction of cutter being employed for cutting wire of extra thickness. In this form of cutter the bracket A² is extended to one side as shown at A³, and provided with an additional spring catch C', which engages the end of the hilt and holds the bracket securely in position at that end.

In Fig. 6, we have illustrated a still further modification, in which the two cutting disks are employed and in Fig. 7, we show a still further modification consisting of a sliding band K, having a cutting edge K', and to which is pivoted a cutting blade L, and pivotally connected to this cutting blade is a link M, the opposite end of which, is pivotally connected to the bracket, as shown at M'. The sliding band K, is provided with a collar K²; at one side thereof, through which works a guide pin N, fastened to the bracket and surrounding this pin, and bearing upon the bracket, and band is the coil spring O, the purpose of which is to throw the band forward the moment the cutting operation is completed, it being understood that as the wire is forced, into contact with the cutting edges, the blade is forced rearwardly thereby forcing the cutting blades through the wire and the moment the cutting operation is completed, the spring will return the parts to their normal or open position.

These modifications have been shown and described, for the purpose of showing the various forms in which our invention can be embodied, but in practice, we have found the construction illustrated in Figs. 1, 2 and 3, to be highly efficient and thoroughly practical.

Having thus fully described our invention, what we claim as new and desire to secure by Letters Patent, is:—

1. The combination with an offensive weapon, of a cutting device carried thereby, said cutting device having two co-acting cutting members, one of which is movable, said movable cutting member being arranged obliquely across one edge of said offensive weapon whereby said weapon will serve to direct the article to be cut to the cutting device, the introduction of the article serving to bring the cutting members into operation, as set forth.

2. The combination with an offensive weapon, of a wire cutting device detachably connected to the hilt of said weapon, said cutting device having two co-acting cutting members, one of which is movable, the edge of said movable member being arranged obliquely to and across the weapon whereby said weapon serves to direct the wire to the cutting device, the introduction of said wire serving to bring the cutting members into operative action, for the purpose set forth.

3. The combination with a bayonet, of a cutting device connected to the hilt end of said bayonet, said cutting device comprising a bracket and a pair of cutting members, the cutting edge of one of the members being arranged oblique to and across the edge of the bayonet, whereby said bayonet serves to guide the wire to be cut to the cutting members.

4. The combination of a bayonet and wire cutting device connected to the hilt end thereof, said cutting device comprising a rotary cutting wheel and a pivoted cutting blade, the edge of said cutting blade being arranged oblique to and across the edge of the bayonet whereby said bayonet edge serves to guide the wire to the cutting wheel and blade.

5. In a device of the kind described, a wire cutting device adapted to be connected to the hilt of a bayonet, said cutting device comprising a bracket, a cutting blade pivoted to the bracket and a cutting disk carried by the bracket and adapted to co-act with the cutting blade to cut the wire, said parts being so constructed and arranged that when placed upon the hilt of the bayonet the cutting edge of the blade will be oblique to and extend across one edge of the bayonet, as set forth.

6. The combination with a guiding member, of a carrying means arranged thereon and a pair of cutting members carried by said carrying means, one of said cutting members extending obliquely across said guiding member whereby the article to be cut can be guided into and between said cutting members, the introduction of the article serving to move said cutting members together for the purpose of severing the said article.

7. The combination with a guiding member, of a carrying means adapted to be arranged thereon, a pair of cutting members carried by said carrying member and means for normally holding said cutting members apart, one of said cutting members being adapted to extend obliquely across the edge of said guiding member when the carrying member is arranged thereon, said guiding member serving to direct the wire to be cut between said cutting members, the introduction of said article serving to move the cutting members together for the purpose specified.

GEORGE F. NELSON.
JOSEPH H. BEAN.

Witnesses:
L. D. KILBORN,
CHAS. C. MYERS.